(12) United States Patent
He

(10) Patent No.: US 10,571,745 B2
(45) Date of Patent: Feb. 25, 2020

(54) QUANTUM DOT FILM, BACKLIGHT UNIT USING SAME, AND LIQUID CRYSTAL DISPLAY THEREOF

(71) Applicant: HUIZHOU CHINA STAR OPTOELECTRONICS TECHNOLOGY CO., LTD., Huizhou, Guangdong (CN)

(72) Inventor: Xiaoyu He, Huizhou, Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 14 days.

(21) Appl. No.: 15/952,742

(22) Filed: Apr. 13, 2018

(65) Prior Publication Data

US 2019/0204633 A1  Jul. 4, 2019

Related U.S. Application Data

(63) Continuation of application No. PCT/CN2018/073169, filed on Jan. 18, 2018.

(30) Foreign Application Priority Data

Dec. 28, 2017 (CN) .......................... 2017 1 1456000

(51) Int. Cl.
*G02F 1/1335* (2006.01)
*F21V 8/00* (2006.01)
*G02F 1/13357* (2006.01)

(52) U.S. Cl.
CPC ..... *G02F 1/133615* (2013.01); *G02B 6/0053* (2013.01); *G02B 6/0055* (2013.01);
(Continued)

(58) Field of Classification Search
None
See application file for complete search history.

(56) References Cited

U.S. PATENT DOCUMENTS 9,535,282 B1 1/2017 Stuppi et al.
2017/0017021 A1* 1/2017 Tokinoya ............... G02B 6/005

FOREIGN PATENT DOCUMENTS

CN 104465911 A 3/2015
CN 104981719 A 10/2015
(Continued)

*Primary Examiner* — Richard H Kim
(74) *Attorney, Agent, or Firm* — Hemisphere Law, PLLC; Zhigang Ma

(57) ABSTRACT

Provided is a quantum dot (QD) film for backlight unit, which includes a first protective film, a second protective film, a QD material layer, and a transmission/reflection film. The first and second protective films are disposed in opposite to each other and the QD material layer is interposed between the first and second protective films. The transmission/reflection film is disposed at the side of the second protective film facing away from the first protective film for reflecting a part of an incident light and transmitting the other part of incident light. Also provided is a backlight unit having such QD film and a liquid crystal display for enhancing the utilization of QD material and the brightness of the light emitted from the backlight unit, and preventing the backlight unit from emitting light with blue tone.

16 Claims, 3 Drawing Sheets

(52) U.S. Cl.
CPC .................. *G02F 1/1336* (2013.01); *G02F 2001/133614* (2013.01); *G02F 2201/50* (2013.01); *G02F 2203/01* (2013.01); *G02F 2203/02* (2013.01)

(56) References Cited

FOREIGN PATENT DOCUMENTS

| | | | |
|---|---|---|---|
| CN | 106200123 A | 12/2016 | |
| CN | 107357080 A | 11/2017 | |
| JP | 2016-194986 A | 11/2016 | |

\* cited by examiner

QUANTUM DOT FILM, BACKLIGHT UNIT USING SAME, AND LIQUID CRYSTAL DISPLAY THEREOF

RELATED APPLICATIONS

The present application is a continuation application of PCT Application No. PCT/CN2018/073169, filed Jan. 18, 2018, which claims the priority benefit of Chinese Patent Application No. 201711456000.2, filed Dec. 28, 2017, which is herein incorporated by reference in its entirety.

FIELD OF THE DISCLOSURE

The invention relates to the field of liquid crystal display technology, and more particularly to a quantum dot film and a backlight unit using same, and the liquid crystal display thereof.

BACKGROUND

With the ever-increasing popularity of high dynamic range (HDR) display, the backlight unit (BLU) of a liquid crystal display (LCD) must be designed to meet the requirements on the wide color gamut operation. Nowadays, a possible way to attain a wide color gamut for display is to use the quantum dot structure. The quantum dot display typically consists of a quantum dot tube and a quantum dot film.

The quantum dot tube is disposed adjacently to the light source. However, the temperature in the ambience of the light source is quite high. Considering the issue of reliability, it would be advantageous to dispose the quantum dot film in the backlight film structure. The most common way to design a wide color gamut display is to dispose a blue-light light-emitting diode (LED) in conjunction with a quantum dot film to emit white light, along with the color filter of the LCD panel to form a wide color gamut space. It is known that quantum dot material is a photoluminescent material, which means that blue light must shine the surface of the quantum dot material to allow the quantum dot material to absorb the blue light, so as to emit red light and green light. For the contemporary direct backlight unit and edge backlight unit, the light emitted from LED directly hits the LCD panel through the quantum dot film, which would in turn cause a low utilization of the quantum got material of the quantum dot film.

A commonly-used approach to enhance the utilization of the quantum dot material is to dispose a quantum dot film at a position nearest to the light source in the backlight film structure, and coat the quantum dot film with two brightness enhancement films (or prism films). A diffuser film may be added so that light can be emitted from the quantum dot film and hits the brightness enhancement films and the diffuser film disposed above. Meanwhile, a part of the light is transmitted therethrough and a part of the light is reflected. The reflected light re-enters the quantum dot film to excite the quantum dot material to emit red light and green light, thereby increasing the excitation efficiency of the quantum dot material. However, this would require the quantum dot film to cooperate with the brightness enhancement films and the diffuser film for enhancing its excitation efficiency. If this approach is applied, the excitation efficiency of the quantum dot film is still too low to excite sufficient amount of red light and green light. Under this condition, the backlight provided for the LCD panel would be represented with blue tone, and the brightness of the LCD is quite low.

SUMMARY

To address the foregoing problems encountered by the prior art, an object of the invention is to provide a quantum dot film for use in the backlight unit for enhancing the utilization of quantum dot material, and the backlight unit using such quantum dot film, and a liquid crystal display thereof.

According to a aspect of the invention, a quantum dot film for use in a backlight unit is provided, which includes a first protective film, a second protective film, a quantum dot material layer, and a transmission/reflection film. The first protective film is disposed in opposite to the second protective film, and the quantum dot material layer is interposed between the first protective film and the second protective film. The transmission/reflection film is disposed at the side of the second protective film facing away from the first protective film. The transmission/reflection film is used to reflect a part of the incident light and transmit the other part of the incident light.

Further, the quantum dot material includes red quantum dot material and green quantum dot material.

According to another aspect of the invention, a backlight unit is provided, which includes a light-guiding plate and a quantum dot film. The light-guiding plate includes a light output surface. The quantum dot film includes a first protective film, a quantum dot film, a second protective film, and a transmission/reflection film, all of which are sequentially disposed atop the light output surface. The transmission/reflection film is used to reflect a part of the incident light and transmit the other part of the incident light.

Further, the light-guiding plate further includes a light input surface located at the side of the light output surface. The backlight unit further includes a light source disposed adjacently to the light input surface. A light output surface of the light source faces the light input surface of the light-guiding plate.

Further, the light source includes a blue-light light-emitting diode (LED).

Further, the backlight unit further includes a first brightness enhancement film disposed on the transmission/reflection film.

Further, the backlight unit further includes a second brightness enhancement film disposed on the first brightness enhancement film.

Further, the backlight unit further includes a reflective film. The light-guiding plate further includes a bottom surface in opposite to and parallel with the light output surface of the light-guiding plate. The reflective film is disposed under the bottom surface.

According to another yet aspect of the invention, a liquid crystal display is provided, which includes a LCD panel and a backlight unit, both of which are disposed in opposite to each other. The backlight unit here is the same as the backlight unit stated above.

The benefits of the invention: The invention is able to enhance the utilization of quantum dot material and increase the brightness of the light emitted from the backlight unit, while preventing the backlight unit from emitting light with blue tone.

BRIEF DESCRIPTION OF THE DRAWINGS

The embodiments embodying the invention and other aspects, features, and advantages of the invention will be more clearly explicated by the following descriptions and accompanying drawings. In the figures.

DETAILED DESCRIPTION OF PREFERRED EMBODIMENTS

Figure 1:
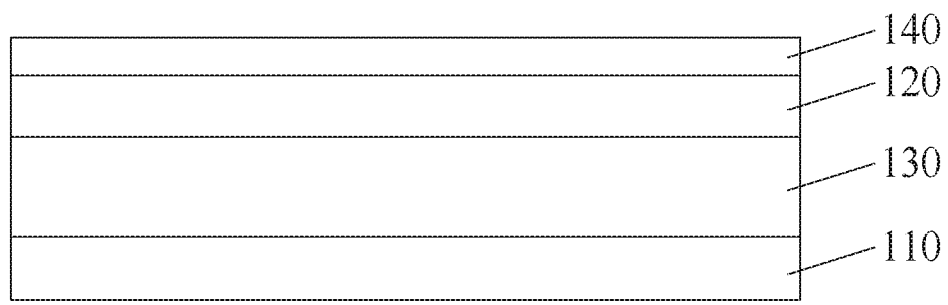
FIG. 1 is a schematic diagram showing the structure of a quantum dot film for use in a backlight unit according to an embodiment of the invention.

Next, an embodiment of the invention will be given by the following detailed descriptions and the accompanying drawings. Nevertheless, the invention can be fulfilled in various forms. Also, the invention should not be construed to be limited to the concrete embodiments described herein. On the contrary, these embodiments are proposed to illustrate the principles and practical applications of the invention, in order to allow an artisan skilled in the art to understand that various exemplary embodiments and various modifications to the embodiment can be made to adapt the invention for particular applications.

In the drawings, the thickness of layers and regions are exaggerated. Same reference numeral indicates same element throughout the specification and drawings.

It is to be understood that the phrases of "first" and "second" are used herein to address numerous elements of the invention. However, the number of those elements are not to be limited by such phrases. Such phrases are merely used to distinguish one element from the other element.

FIG. 1 shows the structure of a quantum dot film for use in the backlight unit according to an embodiment of the invention.

Please refer to FIG. 1, in which the quantum dot film 100 for use in the backlight unit according to an embodiment of the invention includes: a first protective film 110, a second protective film 120, a quantum dot material layer 130, and a transmission/reflection film 140.

Concretely speaking, the first protective film 110 is disposed in opposite to the second protective film 120. The quantum dot material layer 130 is interposed between the first protective film 110 and the second protective film 120. The transmission/reflection film 140 is disposed at the side of the second protective film 120 facing away from the first protective film 110. The transmission/reflection film 140 is used to reflect a part of the incident light and transmit the other part of the incident light.

In this embodiment, it is preferred that the quantum dot material layer 130 of the invention includes, but not limited to, red quantum dot material and green quantum dot material.

Hence, the incident blue light inputted through the first protective film 110 shines the red quantum dot material and is absorbed thereby, and then red light is emitted to the first protective film 110 and the transmission/reflection film 140. A part of the red light emitted to the transmission/reflection film 140 exits through the transmission/reflection film 140, and a part of the red light is reflected back to the quantum dot material layer 130 and may be reflected again by the quantum dot material. In addition, when the incident blue light inputted through the first protective film 110 does not shine the quantum dot material but is outputted to the first protective film 110 and the transmission/reflection film 140, a part of the blue light emitted to the transmission/reflection film 140 exits through the transmission/reflection film 140, and a part of the blue light is reflected back to the quantum dot material layer 130 and shines the green quantum dot material and is absorbed thereby. Thus, green light is emitted to the first protective film 110 and the transmission/reflection film 140, in which a part of the green light is emitted to the transmission/reflection film 140 and exits through the transmission/reflection film 140, and a part of the green light is reflected back to the quantum dot material layer 130 and is reflected again by the quantum dot material. Compared to the conventional quantum dot structure, the quantum dot film 100 according to an embodiment of the invention can enhance the utilization of the quantum dot material.

Besides, it it to be understood that the transmittance and reflectivity of the transmission/reflection film 140 can be set depending on practical needs. For example, the transmittance and reflectivity of the transmission/reflection film 140 can be adjusted by controlling the thickness of the transmission/reflection film 140 or changing the material for manufacturing the transmission/reflection film 140.

Figure 2:
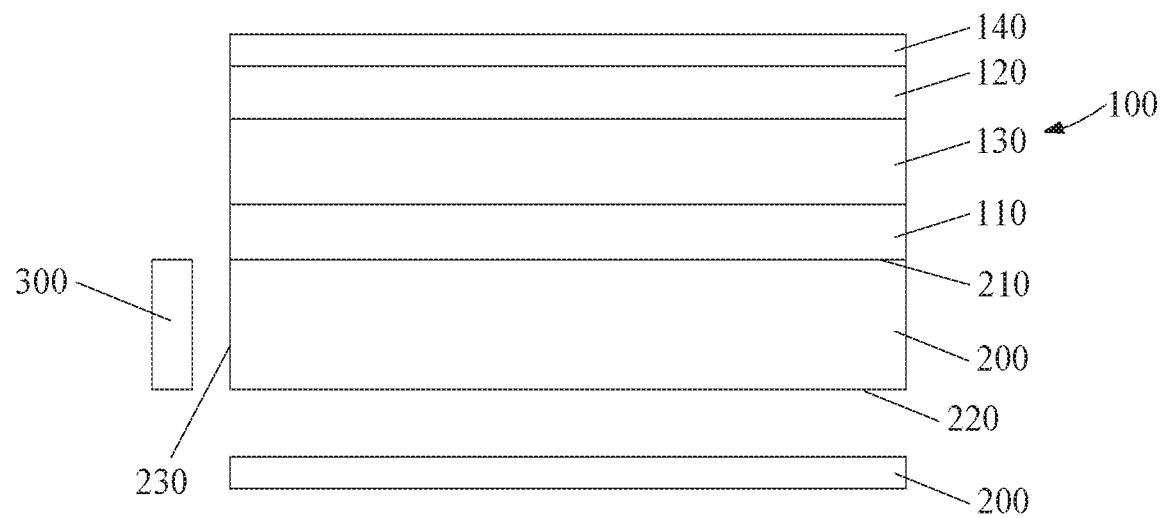
FIG. 2 is a schematic diagram showing the structure of a backlight unit according to an embodiment of the invention.

Next, the application of the quantum dot film to backlight unit will be explicated below. FIG. 2 shows the structure of the backlight unit according to an embodiment of the invention.

Please refer to FIG. 2, in which the backlight unit according to an embodiment of the invention includes a quantum dot film 100, a light-guiding plate 200, a light source 300, and a reflective film 400.

Concretely speaking, the light-guiding plate 200 includes a light output surface 210, a bottom surface 220 opposite to and parallel with the the light output surface 210, and a light input surface 230 connected to one side of the light output surface 210 and the same side of the bottom surface 220.

The first protective film 110, the quantum material layer 130, the second protective film 120, and the transmission/reflection film 140 of the quantum dot film 100 are sequentially disposed atop the light output surface 210. In this embodiment, it is preferred that the quantum dot material layer 130 of the invention includes, but not limited to, red quantum dot material and green quantum dot material.

The light source 300 is disposed adjacently to the light input surface 230. In this embodiment, the light source 300 may be, for example, a blue-light LED. The blue light emitted from the light source 300 enters the light-guiding plate 200 through the light input surface 230 and exits through the light output surface 210.

The reflective film 400 is disposed under the bottom surface 220. The blue light in the interior of the light-guiding plate 200 exits through the bottom surface 220 and outputs to the reflective film 400. Afterwards, the reflective film 400 reflects the inputted blue light back to the interior of light-guiding plate 200, thereby increasing the utilization of the blue light in the interior of the light-guiding plate 200. In accordance with an embodiment of the invention, the reflective film 400 is optional.

Thus, the blue light exiting through the light output surface 210 shines the red quantum dot material and is absorbed thereby, thereby emitting red light to the first protective film 110 and the transmission/reflection film 140. A part of the red light outputted to the transmission/reflection film 140 exits through the transmission/reflection film 140, and a part of the red light is reflected to the quantum dot material layer 130 and is reflected again to the transmission/reflection film 140 by the quantum dot material. Besides, when the blue light light exiting through the light output surface 210 does not shine the red quantum dot material but is outputted to the first protective film 110 and the transmission/reflection film 140, a part of the blue light emitted to the transmission/reflection film 140 exits through the transmission/reflection film 140, and a part of the blue light is reflected back to the quantum dot material layer 130 and shines the green quantum dot material and is absorbed thereby. Thus, green light is emitted to the transmission/reflection film 140, in which a part of the green light exits through the transmission/reflection film 140, and a part of the green light is reflected back to the quantum dot material layer 130 and is reflected again to the transmission/reflection film 140 by the quantum dot material layer 130. Compared to the conventional quantum dot structure, the quantum dot film 100 according to an embodiment of the invention can enhance the utilization of the quantum dot material, and increase the extraction efficiency and color gamut of the backlight unit.

In addition, compared to the prior art, the backlight unit according to an embodiment of the invention does not include a commonly-used brightness enhancement film and a diffuser film, so as to reduce the thickness of the backlight unit.

Figure 3:
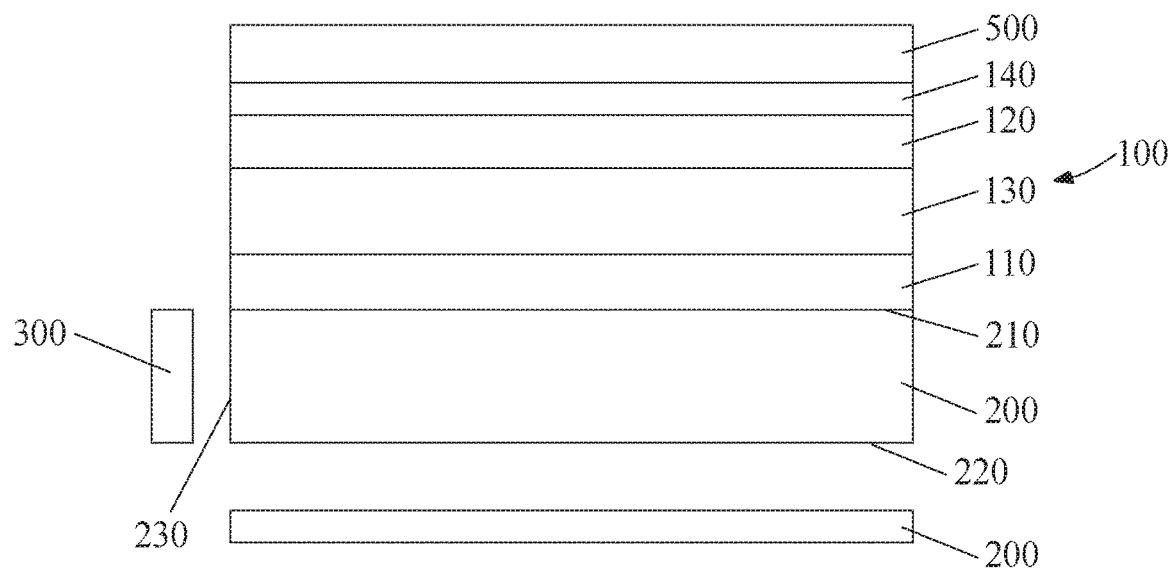
FIG. 3 is a schematic diagram showing the structure of a backlight unit according to another embodiment of the invention.

FIG. 3 shows the structure of the backlight unit according to another embodiment of the invention. Please refer to FIG. 3, the difference between the structure of the backlight unit shown in FIG. 2 and the structure shown in FIG. 3 is that the backlight unit according to another embodiment of the invention may additionally include a first brightness enhancement film 500. The first brightness enhancement film 500 is disposed on the transmission/reflection film 140 for enhancing the utilization of the quantum dot material and increasing the brightness of the light emitted from the backlight unit.

Figure 4:
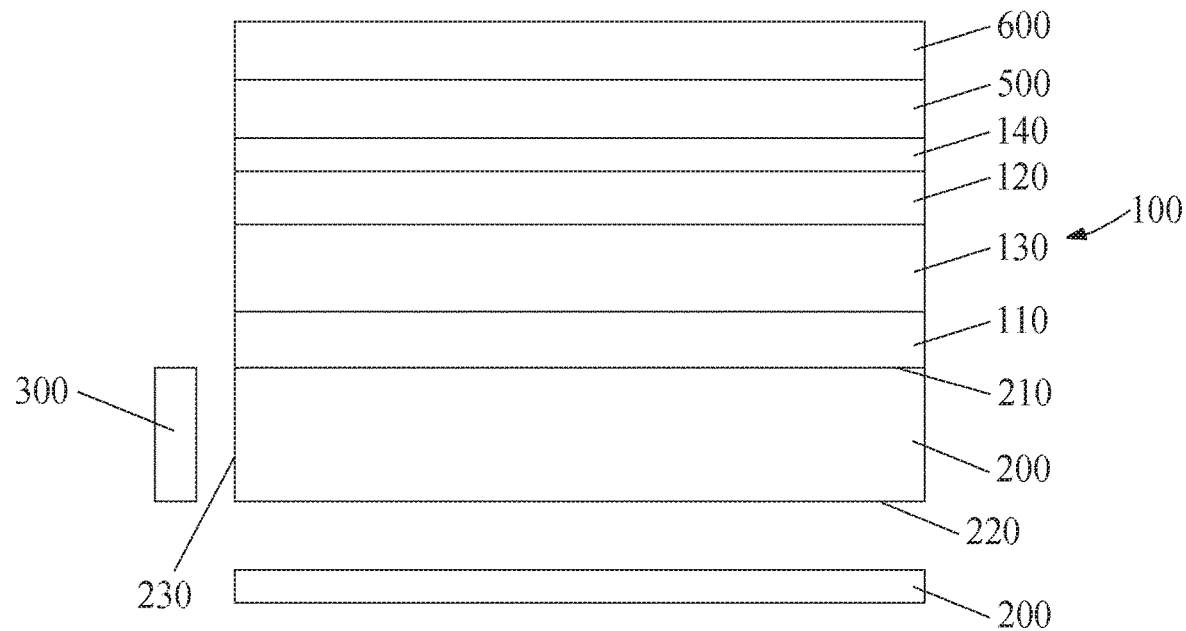
FIG. 4 is a schematic diagram showing the structure of a backlight unit according to another yet embodiment of the invention.

FIG. 4 shows the structure of the backlight unit according to another yet embodiment of the invention. Please refer to FIG. 4, the difference between the structure of the backlight unit shown in FIG. 3 and the structure shown in FIG. 4 is that the backlight unit according to another yet embodiment of the invention may additionally include a second brightness enhancement film 600. The second brightness enhancement film 6500 is disposed on the first brightness enhancement film 500 for further enhancing the utilization of the quantum dot material and further increasing the brightness of the light emitted from the backlight unit.

Figure 5:
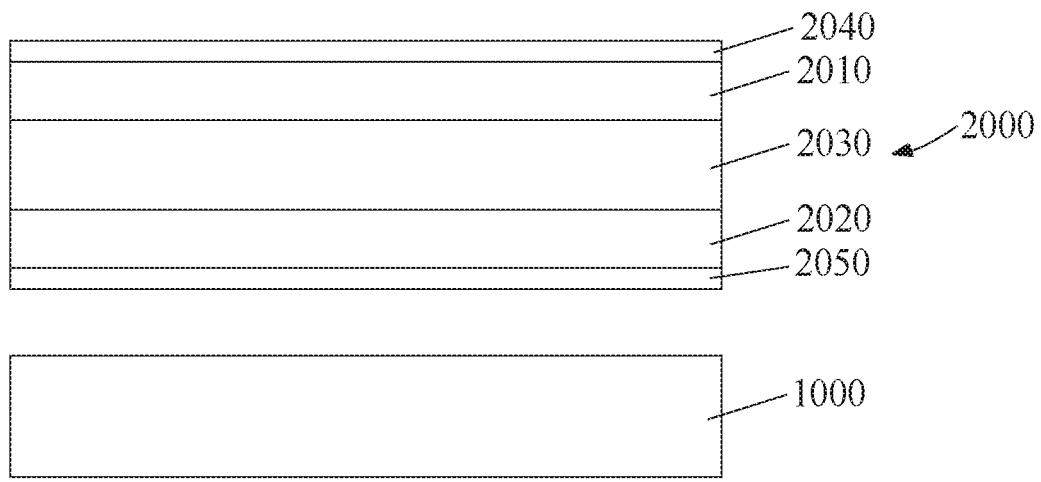
FIG. 5 is a schematic diagram showing the structure of liquid crystal display according to an embodiment of the invention.

FIG. 5 shows the structure of a liquid crystal display according to an embodiment of the invention.

Please refer to FIG. 5. The liquid crystal display according to an embodiment of the invention includes: a backlight unit 1000 and a LCD panel 2000, both of which are disposed in opposite to each other. Thus, the backlight unit 1000 provides light for the LCD panel 2000 for allowing the LCD panel 2000 to display image.

The LCD panel 2000 includes: a color filter substrate 2010 and an array substrate 2020 assembled in opposite to each other in the liquid cell, and a liquid crystal layer 2030 interposed between the color filter substrate 2010 and the array substrate 2020. The color filter substrate 2010, the array substrate 2020, and the liquid crystal layer 2030 together form a liquid crystal cell. The LCD panel 2000 further includes a first polarizer 2040 adhered to a first surface of the liquid crystal cell (i.e. the surface of the color filter substrate 2010 facing away from the array substrate 2020), and a second polarizer 2050 adhered to a second surface of the liquid crystal cell (i.e. the surface of the array substrate 2020 facing away from the color filter substrate 2010). The backlight unit 1000 faces the second polarizer 2050. Further, the backlight unit may be one of the aforementioned backlight units.

In conclusion, according to the embodiment of the invention, the invention is able to enhance the utilization of quantum dot material and increase the brightness of the light emitted from the backlight unit, while preventing the backlight unit from emitting light with blue tone.

Although the invention has been described by reference to the specific embodiment disclosed herein, an artisan skilled in the art would understand that various modifications to details and forms of the embodiment can be made without departing from the spirit and principles of the invention, which is defined by the appended claims and their equivalents.

What is claimed is:
1. A quantum dot film for use in a backlight unit, comprising:
   a first protective film;
   a second protective film;
   a quantum dot material layer; and
   a transmission/reflection film;
      wherein the first protective film and the second protective film are disposed in opposite to each other, and the quantum dot material layer is interposed between the first protective film and the second protective film, and wherein the transmission/reflection film is disposed at the side of the second protective film facing away from the first protective film, and the transmission/reflection film is used to reflect a part of an incident red light, a part of an incident green light and a part of an incident blue light, and transmit the other part of the incident red light, the other part of the incident green light and the other part of the incident blue light.

2. The quantum dot film according to claim 1, wherein the quantum dot material layer includes red quantum dot material and green quantum dot material.

3. A backlight unit, comprising:
   a light-guiding plate; and
   a quantum dot film;
      wherein the light-guiding plate includes a light output surface, and the quantum dot film includes a first protective film, a quantum dot material layer, a second protective film, and a transmission/reflection film, all of which are sequentially disposed atop the light output surface, and wherein the transmission/reflection film is used to reflect a part of an incident red light, a part of an incident green light and a part of an incident blue light, and transmit the other part of the incident red light, the other part of the incident green light and the other part of the incident blue light.

4. The quantum dot film according to claim 1, wherein the quantum dot material layer includes red quantum dot material and green quantum dot material.

5. The backlight unit according to claim 3, wherein the light-guiding plate further includes a light input surface located at the side of the light output surface, and wherein the backlight unit further includes a light source disposed adjacently to the light input surface, wherein the light source includes a light output surface facing the light input surface of the light-guiding plate.

6. The backlight unit according to claim 5, wherein the light source includes a blue-light light-emitting diode (LED).

7. The backlight unit according to claim 3, further comprising a first brightness enhancement film disposed on the transmission/reflection film.

8. The backlight unit according to claim 7, further comprising a second brightness enhancement film disposed on the first brightness enhancement film.

9. The backlight unit according to claim 3, further comprising a reflective film, and wherein the light-guiding plate further includes a bottom surface in opposite to and parallel with the light output surface of the light-guiding plate, and wherein the reflective film is disposed under the bottom surface.

10. A liquid crystal display (LCD), comprising:
a backlight unit, wherein the backlight unit comprises:
a light-guiding plate; and
a quantum dot film;
wherein the light-guiding plate includes a light output surface, and the quantum dot film includes a first protective film, a quantum dot material layer, a second protective film, and a transmission/reflection film, all of which are sequentially disposed atop the light output surface, and wherein the transmission/reflection film is used to reflect a part of an incident red light, a part of an incident green light and a part of an incident blue light, and transmit the other part of the incident red light, the other part of the incident green light and the other part of the incident blue light; and
a LCD panel;
wherein the backlight unit and the LCD panel are disposed in opposite to each other.

11. The liquid crystal display according to claim 10, wherein the quantum dot material layer includes red quantum dot material and green quantum dot material.

12. The liquid crystal display according to claim 10, wherein the light-guiding plate further includes a light input surface located at the side of the light output surface, and wherein the backlight unit further includes a light source disposed adjacently to the light input surface, wherein the light source includes a light output surface facing the light input surface of the light-guiding plate.

13. The liquid crystal display according to claim 12, wherein the light source includes a blue-light light-emitting diode (LED).

14. The liquid crystal display according to claim 10, wherein the backlight unit further includes a first brightness enhancement film disposed on the transmission/reflection film.

15. The liquid crystal display according to claim 14, wherein the backlight unit further includes a second brightness enhancement film disposed on the first brightness enhancement film.

16. The liquid crystal display according to claim 10, wherein the backlight unit further includes a reflective film, and wherein the light-guiding plate further includes a bottom surface in opposite to and parallel with the light output surface of the light-guiding plate, and wherein the reflective film is disposed under the bottom surface.

* * * * *